March 12, 1940.  A. LUBIN  2,193,518

COMPOSITION GUIDE

Filed April 24, 1939

Inventor
Alfred Lubin,
By Stanley Burch
Attorney

Patented Mar. 12, 1940

2,193,518

UNITED STATES PATENT OFFICE 2,193,518

COMPOSITION GUIDE

Alfred Lubin, Chicago, Ill., assignor to Lumax Photo Utilities, Chicago, Ill., a copartnership composed of Alfred Lubin and Fred A. Mann Application April 24, 1939, Serial No. 269,733

3 Claims. (Cl. 33—64)

This invention relates to a device adapted to be used by a photographer or an artist as an aid in getting composition of a picture in dynamic symmetry.

Good composition in a picture, or expressing to others the thought that is in the artist's or photographer's mind, is the result of a sequence of form and proportion. Dynamic symmetry means a certain form of composition, or a way of building a picture or other object in good proportion so that it is pleasing to the eye. In other words, dynamic symmetry means a composition of spaces or areas, one in harmony or sequence with another.

Dynamic symmetry first takes the original form of a square, and it is called the root one rectangle. Measuring the diagonal or hypotenuse of this rectangle, the length of the next proportionate form or rectangle is obtained, and the latter rectangle conforms to the proportion of most pictures and is called the root two rectangle. By taking the diagonal of the root two rectangle, the length of the root three rectangle is obtained, and so on.

An important object of the present invention is to provide a guide of the above kind which is simple in construction, easy to use, and efficient in use.

The present invention consists in the novel features and construction hereinafter more fully described, shown in the accompanying drawing and claimed.

Figure 1:
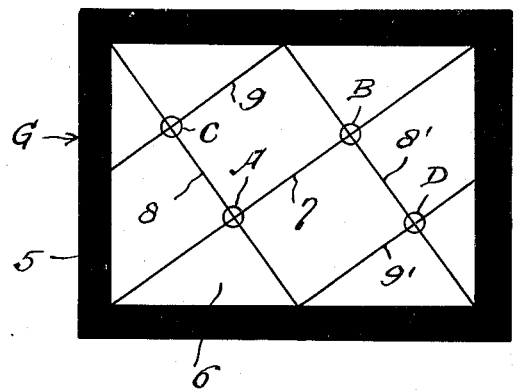
Figure 1 is an elevational view of a composition guide constructed in accordance with the present invention.

Referring in detail to the drawing, the present composition guide consists of a rectangular plate having an opaque margin 5 and provided within this margin with a transparent rectangular portion 6 of a size conforming with that of the desired proportionate form or rectangle. A diagonal line 7 extends between two far corners of the rectangular transparent portion 6, and this diagonal line is crossed at right angles by an oblique line 8, one end of which terminates at one of the remaining corners of the rectangle. Another oblique line 8' crosses the diagonal line 7 at right angles and terminates at one end at the other of said remaining corners of the rectangle. Where these lines cross, the rectangular transparent portion 6 is provided with circles A and B indicating the artistic centers of the rectangle. Any one of these points may be considered as the principal point of interest, and the other will be considered as the secondary point of interest.

Two other oblique lines 9 and 9' are provided on the transparent portion 6, one extending from the inner end of each of the oblique lines 8 and 8' and crossing the other oblique line at right angles to the latter. Where the lines 9 and 9' cross the lines 8 and 8', the transparent portion 6 is provided with further circles C and D indicating the secondary points of interest. Either of the points C or D may be considered as the third point of interest in the picture to be composed, and the other will be considered as the fourth point of interest. All four points of interest are in harmony or sequence with each other.

Figure 2:
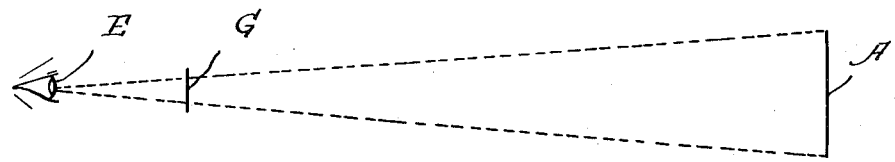
Figure 2 is a diagrammatic view illustrating the manner in which the composition is used.

The present composition guide may be placed on the finder lens of a camera, but its purpose will best be served by using it as a separate instrument. The photographer or artist must first find the subject matter of his picture, after which he views the subject matter through the guide as illustrated by the diagram in Figure 2. As shown, the guide generally indicated at G is placed between the eye E and the picture area A, being placed nearer the eye. By viewing the subject matter in this way, the photographer or artist is in a position to arrange the principal and secondary points of interest of the subject matter at the places designated by the guide, thus insuring a sequence of proportion. There is no set rule as to which point may be considered as the principal point of interest. This device merely serves as a guide to compose the artistic centers in a balanced sequence of form. One cannot say that certain lines and points must be followed, as this would cause the composition to become hard, cold and mechanical. However, no matter what position is used as the principal point of interest, the others will be in a balanced sequence with it. This guide may be used in a horizontal or vertical position with equal effect, and by coloring the portion 6, the device may also be used as a monochrome filter. By making the transparent portion 6 a dark blue color, the device may be used as a filter for orthochromatic film and for panchromatic film, a dark green color will be used. The artist and the photographer use the guide in the same way, but the artist will have no use for the monotone filter feature. The monotone filter is used by the photographer as an aid in judging the lighting of scenes taken on monochrome or black and white film. The photographer's eye sees the scene in its natural colors, and it is difficult for him to judge the scene as the film will record it. Scenes viewed through the filter show up in the contrast of light and shadow as it will record on the film. Seeing the picture as the film "sees" it allows the photographer to obtain a better photo with improved degree of shadow graduations. Thus, the device will aid in composing the objects, areas, light and shadow at the same time. The opaque border 5 is used to give the artist or photographer a preconceived idea in his mind of what the picture would look like within a frame.

Figure 3:
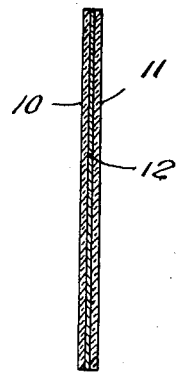
Figure 3 is a vertical sectional view through a modified form of composition guide constructed in accordance with the present invention.

In the simplest form of the invention as shown in Figure 1, the device may be constructed of heavy Celluloid with the lines and circles engraved or stamped thereon. However, as shown in Figure 3, the plate forming the guide may also be constructed of two sheets of clear glass 10 and 11 with a thin piece of transparent parchment or the like secured therebetween as at 12. The parchment or the like may be of the correct or desired color when the filter effect is desired or may be transparent when no filter effect is desired. Also, the lines and circles in this form of the invention are suitably provided on the intermediate sheet of transparent parchment or the like 12, and likewise with respect to the opaque border 5. Otherwise, the filter of Figure 3 will conform in every detail to that of Figure 1, the device of Figure 3 being merely shown to illustrate that the guide may be of a laminated form.

From the foregoing description, it is believed that the purpose and manner of use of the present invention, as well as its advantages, will be readily understood and appreciated by those skilled in the art.

What I claim as new is:

1. A composition guide of the class described comprising a rectangular plate having an opaque border and provided within said border with a transparent rectangular portion conforming to the size of a desired proportionate form or rectangle, a diagonal line extending between two far corners of said transparent portion, oblique lines crossing said diagonal line at right angles and each having one end terminating in a respective one of the remaining corners of the rectangular transparent portion, and two further lines each extending from the inner end of a respective one of said oblique lines and crossing the other oblique line at right angles.

2. A composition guide of the class described comprising a rectangular plate having an opaque border and provided within said border with a transparent rectangular portion conforming to the size of a desired proportionate form or rectangle, a diagonal line extending between two far corners of said transparent portion, oblique lines crossing said diagonal line at right angles and each having one end terminating in a respective one of the remaining corners of the rectangular transparent portion, and two further lines each extending from the inner end of a respective one of said oblique lines and crossing the other oblique line at right angles, and circles centered substantially at the points where said lines cross indicating points of principal and secondary interest in the picture to be composed.

3. A composition guide of the class described comprising a rectangular plate having an opaque border and provided within said border with a transparent rectangular portion conforming to the size of a desired proportionate form or rectangle, a diagonal line extending between two far corners of said transparent portion, oblique lines crossing said diagonal line at right angles and each having one end terminating in a respective one of the remaining corners of the rectangular transparent portion, and two further lines each extending from the inner end of a respective one of said oblique lines and crossing the other oblique line at right angles, said plate comprising two sheets of clear glass with a transparent sheet of parchment or the like secured therebetween, said lines being provided on said sheet of parchment or the like.

ALFRED LUBIN.